US009854178B2

United States Patent
Taniguchi

(10) Patent No.: US 9,854,178 B2
(45) Date of Patent: Dec. 26, 2017

(54) IMAGE PICKUP APPARATUS WITH FLICKER DETECTION AND HAVING PLURALITY OF UNIT PIXEL AREAS, CONTROL METHOD THEREFOR, AND STORAGE MEDIUM

(71) Applicant: CANON KABUSHIKI KAISHA, Tokyo (JP)

(72) Inventor: Hidenori Taniguchi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/723,806

(22) Filed: May 28, 2015

(65) Prior Publication Data

US 2015/0358570 A1 Dec. 10, 2015

(30) Foreign Application Priority Data

Jun. 4, 2014 (JP) ................. 2014-115749

(51) Int. Cl.
*H04N 5/235* (2006.01)
*H04N 5/353* (2011.01)
*H04N 5/355* (2011.01)

(52) U.S. Cl.
CPC ......... *H04N 5/2357* (2013.01); *H04N 5/2353* (2013.01); *H04N 5/3535* (2013.01); *H04N 5/35563* (2013.01)

(58) Field of Classification Search
CPC .. H04N 5/3765; H04N 5/2353; H04N 5/2357; H04N 9/73
See application file for complete search history.

(56) References Cited

U.S. PATENT DOCUMENTS

| 8,441,551 | B2 * | 5/2013 | Greenland | ............. | G03B 19/18 |
| | | | | | 348/228.1 |
| 8,525,917 | B2 | 9/2013 | Taniguchi | | |
| 9,083,887 | B2 * | 7/2015 | Voronov | ............. | H04N 5/2353 |
| 2011/0096193 | A1 * | 4/2011 | Egawa | ............. | H04N 5/235 |
| | | | | | 348/226.1 |

(Continued)

FOREIGN PATENT DOCUMENTS

| JP | 2004-193922 A | 7/2004 |
| JP | 2012-235325 A | 11/2012 |
| JP | 2013-042298 A | 2/2013 |

*Primary Examiner* — James Hannett
*Assistant Examiner* — Akshay Trehan
(74) *Attorney, Agent, or Firm* — Fitzpatrick, Cella, Harper & Scinto

(57) ABSTRACT

An image pickup apparatus which is capable of calculating light amount changing characteristics of an object with high accuracy and enlarging a dynamic range during photometric measurement. An image pickup device of the image pickup apparatus has a plurality of unit pixel areas arranged in a two-dimensional matrix, and a first pixel and a second pixel are included in each of the unit pixel areas. When a flicker detection mode in which an image signal for use in calculating the light amount changing characteristics of the object is obtained is selected, a first accumulation period and a second accumulation period for the first pixels and the second pixels, respectively, are set such that a first barycentric position which is a barycentric position of the first accumulation period and a second barycentric position which is a barycentric position of the second accumulation period correspond to each other.

12 Claims, 6 Drawing Sheets

(56) References Cited

U.S. PATENT DOCUMENTS

| | | | | |
|---|---|---|---|---|
| 2011/0267506 A1* | 11/2011 | Klijn | .................... | H04N 5/2357 348/241 |
| 2011/0292241 A1* | 12/2011 | Segapelli | ............. | H04N 5/2357 348/226.1 |
| 2012/0224097 A1* | 9/2012 | Klijn | .................... | H04N 5/2357 348/362 |
| 2013/0271623 A1* | 10/2013 | Jo | ........................ | H04N 5/2357 348/226.1 |
| 2014/0375848 A1* | 12/2014 | Yamamoto | ........... | H04N 5/2355 348/241 |
| 2015/0130967 A1* | 5/2015 | Pieper | .................. | H04N 5/2355 348/239 |
| 2015/0312464 A1* | 10/2015 | Peng | .................... | H04N 5/2357 348/226.1 |

\* cited by examiner

OBJECT BRIGHTNESS DETECTION MODE

FLICKER DETECTION MODE

IMAGE PICKUP APPARATUS WITH FLICKER DETECTION AND HAVING PLURALITY OF UNIT PIXEL AREAS, CONTROL METHOD THEREFOR, AND STORAGE MEDIUM

BACKGROUND OF THE INVENTION

Field of the Invention

The present invention relates to an image pickup apparatus, a control method therefor, and a storage medium, and in particular to an image pickup apparatus capable of calculating light amount changing characteristics of an object and enlarging a dynamic range.

Description of the Related Art

Conventionally, image pickup apparatuses such as digital cameras reduce unevenness of exposure arising from periodical changes in the amount of light from an object caused by, for example, lighting through alternating current. For example, there is an image pickup apparatus which stores electric charge in a photometric device of an electric charge accumulation type for a first accumulation period for photometric measurement or a second accumulation period for detecting flicker arising from periodical changes in luminance of a light source. This image pickup apparatus performs photometric measurement based on output from the photometric device in which electric charge was stored for the first accumulation period and detects flicker based on output from the photometric device in which electric charge was stored for the second accumulation period (see Japanese Laid-Open Patent Publication (Kokai) No. 2012-235325).

There is another image pickup apparatus which causes an image pickup unit to perform accumulation for flicker detection so as to detect a frequency of power supplied to a light source which causes flicker in an image and perform accumulation for normal image pickup other than accumulation for flicker detection (see Japanese Laid-Open Patent Publication (Kokai) No. 2013-42298).

There is still another image pickup apparatus which measures a light emission cycle and phase of a light source, and in accordance with the light emission cycle of the light source, causes an electronic shutter and a mechanical shutter to operate in synchronization with each other at the time when the amount of light increases (see Japanese Laid-Open Patent Publication (Kokai) No. 2004-193922).

On the other hand, there is an image pickup apparatus which has an image pickup device having a plurality of pixels differing in terms of sensitivity so as to enlarge a dynamic range in an image obtained as a result of shooting. This image pickup apparatus generates an image with a wide dynamic range by a single exposure.

However, calculation of light amount changing characteristics of an object such as detection of flicker and enlargement of a dynamic range during photometric measurement are not compatible, and when an attempt is made to enlarge a dynamic range during photometric measurement, it is difficult to calculate light amount changing characteristics of an object with high accuracy.

SUMMARY OF THE INVENTION

The present invention provides an image pickup apparatus and a control method therefor which are capable of calculating light amount changing characteristics of an object with high accuracy and enlarging a dynamic range during photometric measurement, as well as a storage medium.

Accordingly, the present invention provides an image pickup apparatus comprising an image pickup device configured to have a plurality of unit pixel areas arranged in a two-dimensional matrix, a setting unit configured to set electric charge accumulation periods for a plurality of first pixels and a plurality of second pixels included in the plurality of unit pixel areas as a first accumulation period and a second accumulation period, respectively, and a mode selection unit configured to select a first mode in which an image signal for use in calculating light amount changing characteristics of light from an object is obtained, or a second mode in which an image signal for use in detecting an object brightness is obtained, wherein when the mode selection unit selects the first mode, the setting unit sets the first accumulation period and the second accumulation period such that a first barycentric position which is a barycentric position of the first accumulation period for the plurality of first pixels included in the plurality of unit pixel areas and a second barycentric position which is a barycentric position of the second accumulation period for the plurality of second pixels included in the plurality of unit pixel areas correspond to each other.

According to the present invention, for a plurality of pixels provided in a unit pixel of the image pickup device and differing in terms of sensitivity, accumulation periods vary between the first mode in which light amount changing characteristics of an object are calculated and the second mode in which an object brightness is detected. As a result, light amount changing characteristics of the object are calculated with high accuracy, and a dynamic range during photometric measurement is enlarged.

Further features of the present invention will become apparent from the following description of exemplary embodiments (with reference to the attached drawings).

BRIEF DESCRIPTION OF THE DRAWINGS

FIGS. 4A and 4B are views useful in explaining the relationship between output from the AE sensor in FIG. 2 and luminance (EV), in which FIG. 4A shows a state before combining, and FIG. 4B shows a state after combining.

FIGS. 5A and 5B are views useful in explaining the relationship between accumulation and readout performed in a camera shown in FIG. 1 and a flicker light source in an object brightness detection mode and a flicker detection mode, in which FIG. 5A shows a case where the camera is placed in the object brightness detection mode, and FIG. 5B shows a case where the camera is placed in the flicker detection mode.

DESCRIPTION OF THE EMBODIMENTS

A description will now be given of an exemplary image pickup apparatus according to an embodiment of the present invention with reference to the drawings.

Figure 1:
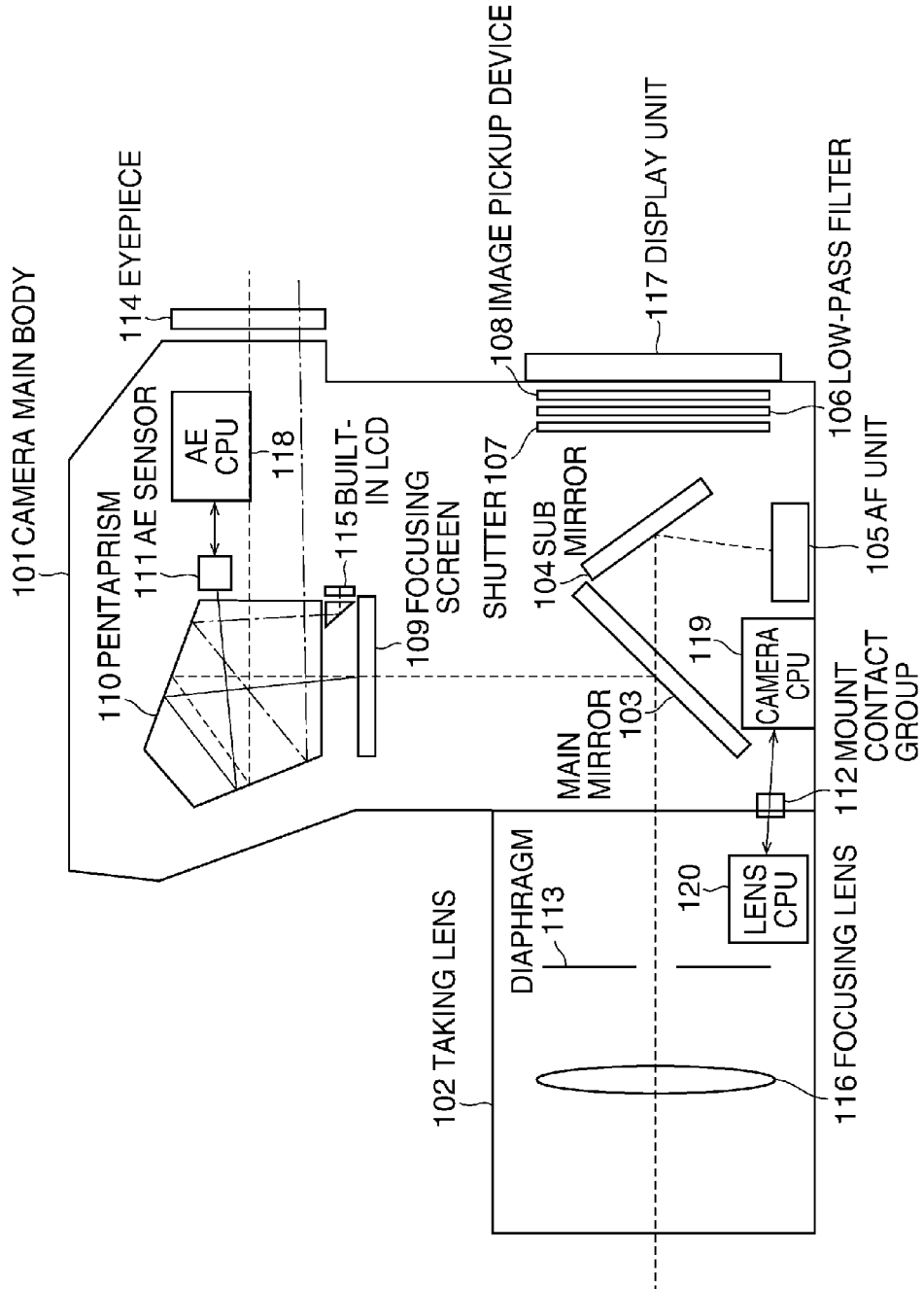
FIG. 1 is a cross-sectional view schematically showing an arrangement of an exemplary image pickup apparatus according to an embodiment of the present invention.

FIG. 1 is a cross-sectional view schematically showing an arrangement of an exemplary image pickup apparatus according to the embodiment of the present invention.

The image pickup apparatus shown in the figure is what is called a single-lens reflex camera (hereafter referred to merely as the camera) and has a camera main body 101 and a taking lens unit (hereafter referred to merely as the taking lens) 102. The taking lens 102 is mounted on a front face of the camera main body 101. The taking lens 102 is removable from the camera main body 101 and interchangeable, and the camera main body 101 and the taking lens 102 are electrically connected together via a mount contact group 112.

The taking lens 102 has a diaphragm 113, which adjusts the amount of light incident on the camera main body 101. The taking lens 102 also has a focusing lens 116, and the focus of the taking lens 102 is adjusted by moving the focusing lens 116 along an optical axis. It should be noted that the taking lens 102 is equipped with a lens CPU 120, which is connected to a camera CPU 119 provided in the camera main body 101 via the mount contact group 112.

A main mirror 103, which is, for example, a half mirror, is placed in the camera main body 101. The main mirror 103 is located diagonally on a shooting optical path (that is, the optical axis) in an observation-through-the-viewfinder state. Thus, the main mirror 103 reflects an optical image, which falls on the main mirror 103 from the taking lens 102, on a viewfinder optical system, and on the other hand, transmitted light having passed through the main mirror 103 falls on an AF unit 105 via a sub mirror 104.

It should be noted that when the camera goes into a shooting state, the main mirror 103 and the sub mirror 104 retract from the shooting optical path.

In the example shown in the figure, the AF unit 105 is an AF sensor using what is called a phase difference detection method. It should be noted that focus detection using the phase difference detection method is well known, and hence detailed description of control therefor is omitted. In focus detection using the phase difference detection method, a secondary image forming surface of the taking lens 102 is formed on a focus detecting lien sensor. As a result, a focus adjustment state of the taking lens 102 is detected, and according to the detection result, the focusing lens 116 is driven to perform automatic focus detection.

A focal plane shutter 107, a low-pass filter 106, and an image pickup device 108 are disposed behind the sub mirror 104. A focusing screen 109 is placed above the main mirror 103. The focusing screen 109 constitutes the viewfinder optical system and is disposed on a predetermined image forming surface of the taking lens 102.

A pentaprism 110 for changing viewfinder optical paths is disposed above the focusing screen 109. An optical image having passed through the pentaprism 110 is sent to an eyepiece 114. This enables a photographer to see a shooting screen as indicated by a broken line by observing the focusing screen 109 through the eyepiece 114.

Further, an optical image falls on an AE (autonomic exposure) sensor 111 via the pentaprism 110 as indicated by a solid line. As a result, the AE sensor 111 performs photometric measurement to measure the brightness of the optical image (that is, an object image). An AE CPU 118 controls the AE sensor 111 to read out the photometric measurement result obtained by the AE sensor 111. As will be described later, the AE CPU 118 then performs changing characteristic computations (hereafter referred to as flicker detecting computations) to calculate light amount changing characteristics of such as intervals at which the amount of light from an object changes and the time at which the amount of light satisfies predetermined conditions (for example, the times at which the amount of light reaches its maximum value and its smallest value). Further, as will be described later, the AE CPU 118 performs object brightness detecting computations. It should be noted that the AE CPU 118 is connected to the camera CPU 119, to be described later, by a bidirectional communication line (not shown).

A built-in LCD 115 is disposed in the camera main body 101, and this built-in LCD 115 is used to display a variety of shooting information. By peeping through the eyepiece 114, a user who is a photographer identifies shooting information such as exposure conditions by means of the built-in LCD 115. Here, as indicated by alternate long and short dashed lines in the figure, when the user peeps through the eyepiece 114, a variety of shooting information is displayed on a lower part of a screen.

A display unit 117 is placed on a rear surface of the camera main body 101. The display unit 117 is comprised of, for example, a liquid crystal display panel. An image obtained as a result of shooting is displayed on the display unit 117. Further, displaying an image signal, which is obtained by the image pickup device 108, on the display unit 117 in real time enables the user to observe an object.

The camera CPU 119 is a camera microcomputer which controls the overall camera and connected to the AE CPU 118, the lens CPU 120, an image processing chip, an AF CPU, various switches (which are not shown), and so on.

As described earlier, the lens CPU 120 is connected to the camera CPU 119 via the mount contact group 112, and under the control of the camera CPU 119, provides lens control such as focus and diaphragm drive for the taking lens 102.

Figure 2:
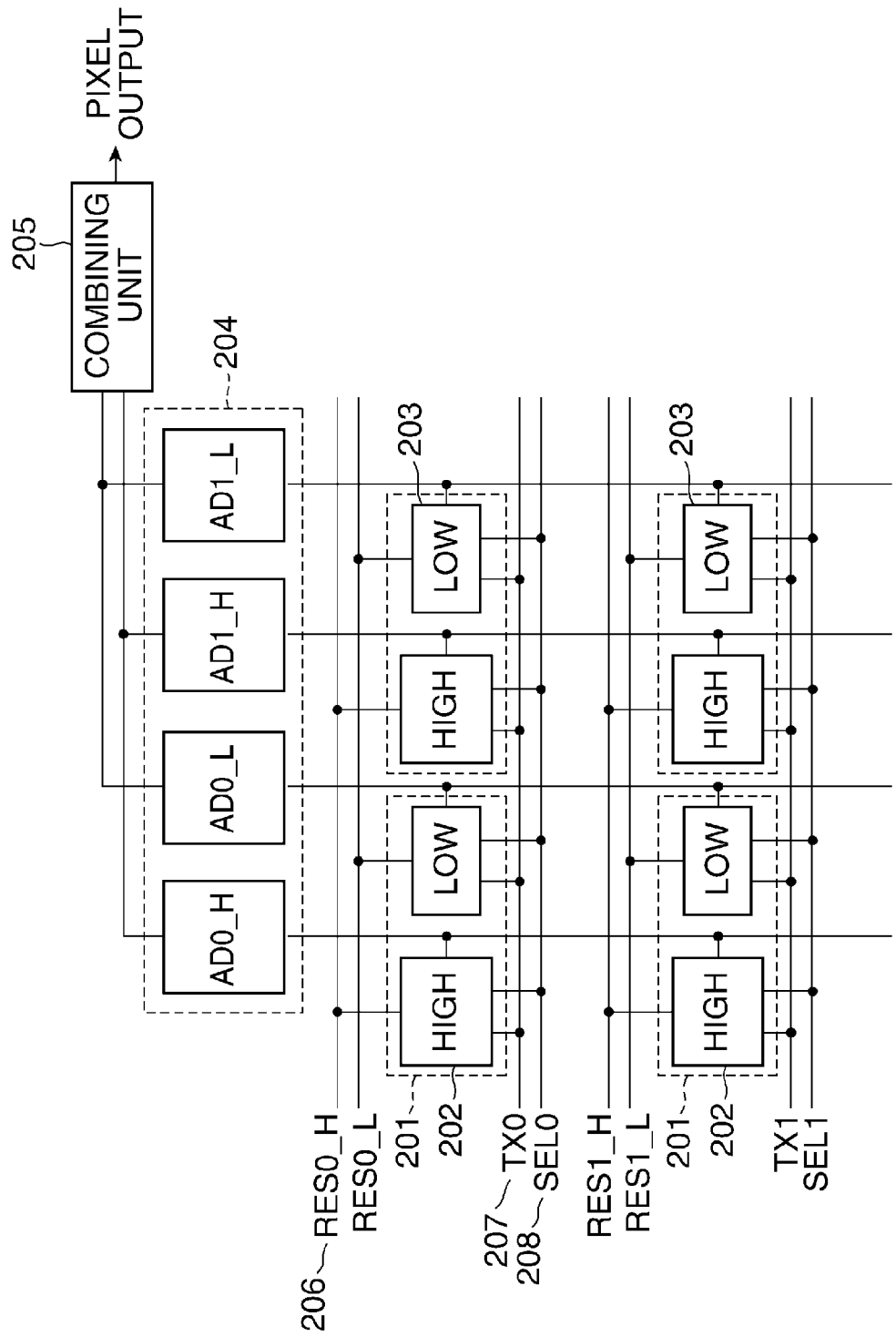
FIG. 2 is a block diagram showing an exemplary arrangement of an AE sensor in FIG. 1.

FIG. 2 is a block diagram showing an exemplary arrangement of the AE sensor 111 in FIG. 1. The AE sensor 111 in FIG. 1 is an image pickup device such as a COMS sensor or a CCD. Here, for brevity, the AE sensor 111 is a CMOS sensor and represented by a pixel array of 2 rows×2 columns.

The AE sensor 111 has unit pixel areas (hereafter referred to as unit pixels) constituting a unit, and these unit pixels 201 are arranged in a two-dimensional matrix. Each of the unit pixels 201 has a high-sensitivity pixel 202 and a low-sensitivity pixel 203 having lower sensitivity than that of the high-sensitivity pixel 202. In the example shown in the figure, the high-sensitivity pixel 202 and the low-sensitivity pixel 203 differ in terms of pixel area (light-receptive area), and accordingly, there is a difference between their sensitivities.

Each of the high-sensitivity pixels 202 and the low-sensitivity pixels 203 has a photodiode, a pixel amplifier, and a stray capacitance (hereafter referred to as "the FD capacitance") although they are not shown in the figure. Each of the high-sensitivity pixels 202 and the low-sensitivity pixels 203 also has a reset transistor for resetting the photodiode and the FD capacitance and a select transistor for selecting the pixel amplifier. It should be noted that an arrangement of a CMOS sensor is known, and hence detailed description thereof is omitted here.

It should be noted that the pixel area of the high-sensitivity pixels 202 and the pixel area of the low-sensitivity pixels 203 may be equal, and their opening areas may be made different using a wiring layer, and further, there may be a difference in sensitivity between them by making their filter transmittances different. Here, although the unit pixels 201 have two pixels differing in terms of sensitivity, the unit pixels 201 may be comprised of three or more pixels differing in terms of sensitivity. The unit pixels 201 may also be comprised of a single pixel.

In the AE sensor 111 shown in the figure, AD converters 204 (AD0_H, AD0_L, AD1_H, AD1_L) are disposed for respective columns, and this enables row-by-row A/D conversion of pixel signals. For each unit pixel 201, a combining unit 205 combines pixel signals which are outputs from the high-sensitivity pixel 202 and the low-sensitivity pixel 203 and outputs the combined signal.

The high-sensitivity pixels 202 and the low-sensitivity pixels 203 are reset by reset signals 206. Here, the high-sensitivity pixels 202 are reset by a reset signal RES0_H or RES1_H, and the low-sensitivity pixels 203 are reset by a reset signal RES0_L or RES1_L. The AE CPU 118 is able to provide reset control such that the high-sensitivity pixels 202 and the low-sensitivity pixels 203 are reset at different times.

In each of the high-sensitivity pixels 202 and the low-sensitivity pixels 203, electric charge stored in the photodiode is transferred to the FD capacitance by a transfer control signal 207. Here, in each of the high-sensitivity pixels 202 and the low-sensitivity pixels 203, electric charge is transferred to the FD capacitance by a transfer control signal TX0 or TX1.

In each of the high-sensitivity pixels 202 and the low-sensitivity pixels 203, the pixel amplifier is selectively controlled by a selection signal 208. Here, in each of the high-sensitivity pixels 202 and the low-sensitivity pixels 203, the pixel amplifier is selectively controlled by a selection signal SEL0 or SEL1. The pixel amplifier converts electric charge transferred to the FD capacitance into voltage, and output from the pixel amplifier is selected by the selection signal 208 and supplied to the AD converter 204. The reset signal 206, the transfer control signals 207, and the selection signals 208 are controlled on a row-by-row basis.

It should be noted that the AE sensor 111 should not necessarily have all the blocks shown in FIG. 2, but for example, the AE CPU 118 may have the combining unit 205.

Figure 3:
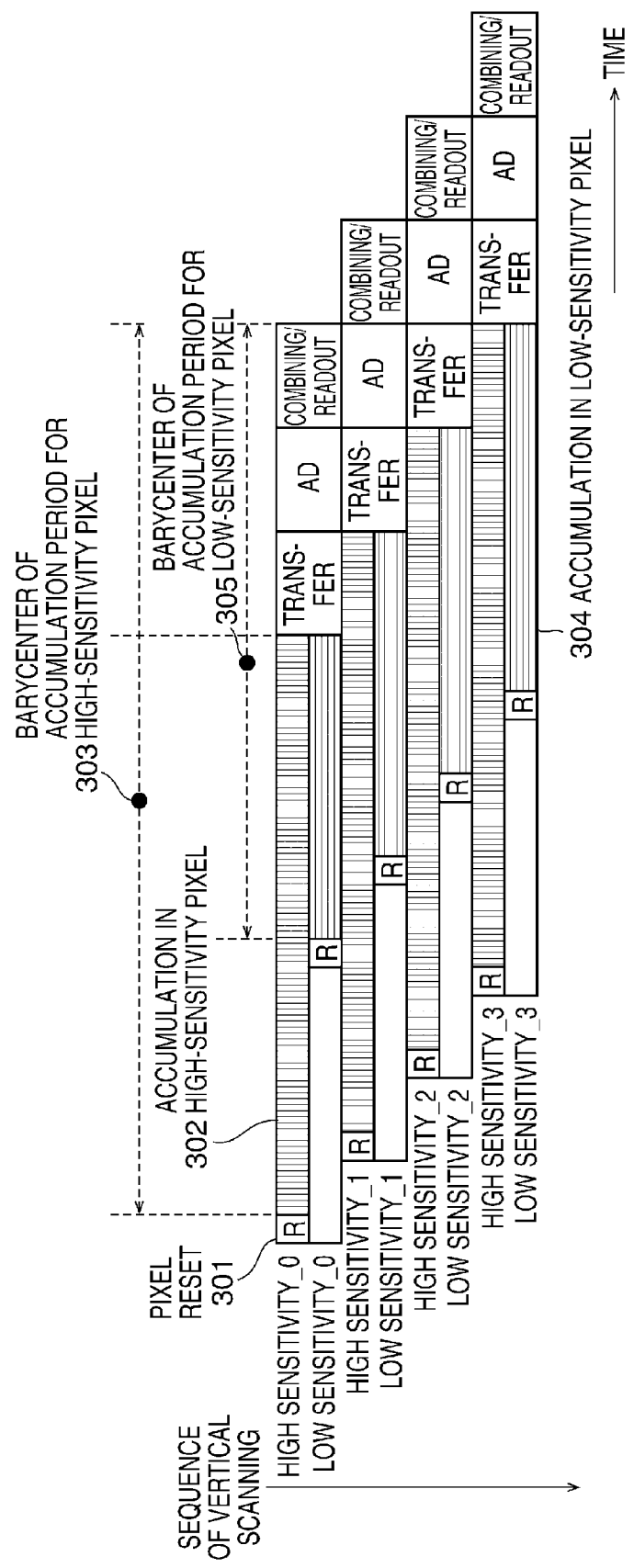
FIG. 3 is a timing chart useful in explaining how the AE sensor in FIG. 2 operates.

FIG. 3 is a timing chart useful in explaining how the AE sensor 111 in FIG. 2 operates.

Here, a description will be given of accumulation and readout of electric charge by the AE sensor 111 by way of control using a known rolling shutter method. Referring to FIG. 3, the axis of the ordinate indicates the passage of time, and in response to operation of the rolling shutter, reset of pixels, accumulation, transfer, A/D conversion, pixel combining, and readout are continuously performed on a row-by-row basis. In the following description, it is assumed that a unit pixel array of the AE sensor 111 has 4 rows×4 columns.

The axis of abscissa indicates the sequence of vertical scanning, and scanning is sequentially performed from high sensitivity 0 and low sensitivity 0 to high sensitivity 3 and low sensitivity 3. At times of pixel reset 301, rolling reset is performed from the first row. It should be noted that a high-sensitivity pixel and a low-sensitivity pixel are subjected to pixel reset at different times. Namely, exposure to light (accumulation of electric charge) is started at different times for a high-sensitivity pixel and a low-sensitivity pixel.

Here, accumulation periods are set for respective pixels. For example, a length of an accumulation period 304 for a low-sensitivity pixel is set equal to or shorter than a length of an accumulation period 302 for a high-sensitivity pixel. As a result, an output with a wide dynamic range is obtained.

In the same unit pixel area, the timing of electric charge transfer for a high-sensitivity pixel and a low-sensitivity pixel is the same. Namely, exposure to light (accumulation of electric charge) is completed at the same time in a high-sensitivity pixel and a low-sensitivity pixel.

A accumulation period barycenter 303 for high-sensitivity pixels represents a barycenter of a period from the start of accumulation in a high-sensitivity pixel on the first row to end of accumulation in a high-sensitivity pixel on the fourth row and is a barycentric position indicative of a center of an accumulation period for all high-sensitivity pixels in one frame. An accumulation period barycenter 305 for low-sensitivity pixels represents a barycenter of a period from the start of accumulation in a low-sensitivity pixel on the first row to end of accumulation in a low-sensitivity pixel on the fourth row and is a barycentric position indicative of a center of an accumulation period for all low-sensitivity pixels in one frame. Making accumulation periods for high-sensitivity pixels and low-sensitivity pixels different makes barycentric positions of accumulation periods for them different.

Figure 4A:
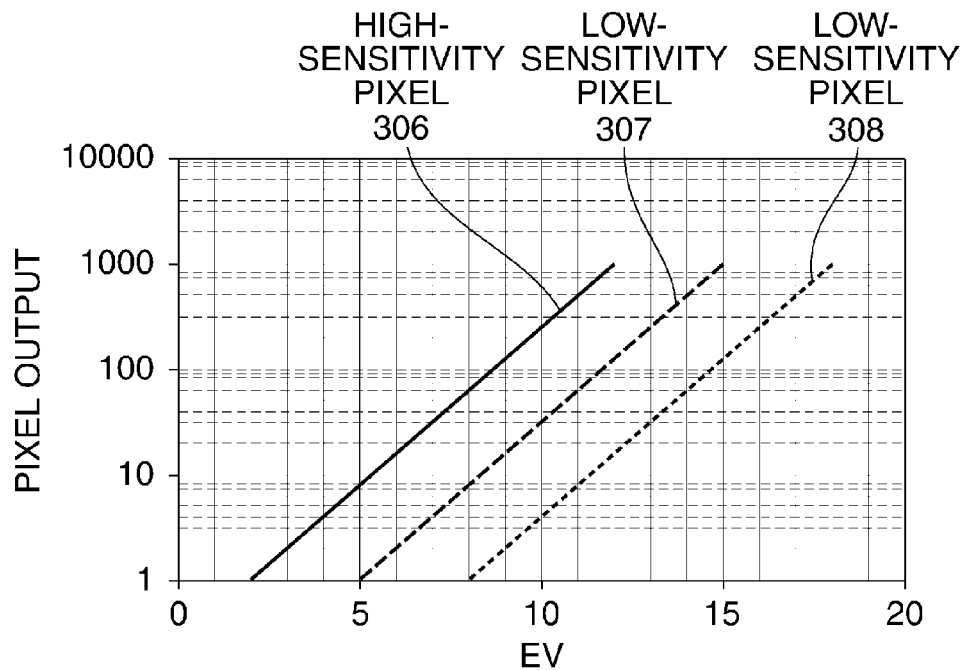
Figure 4B:
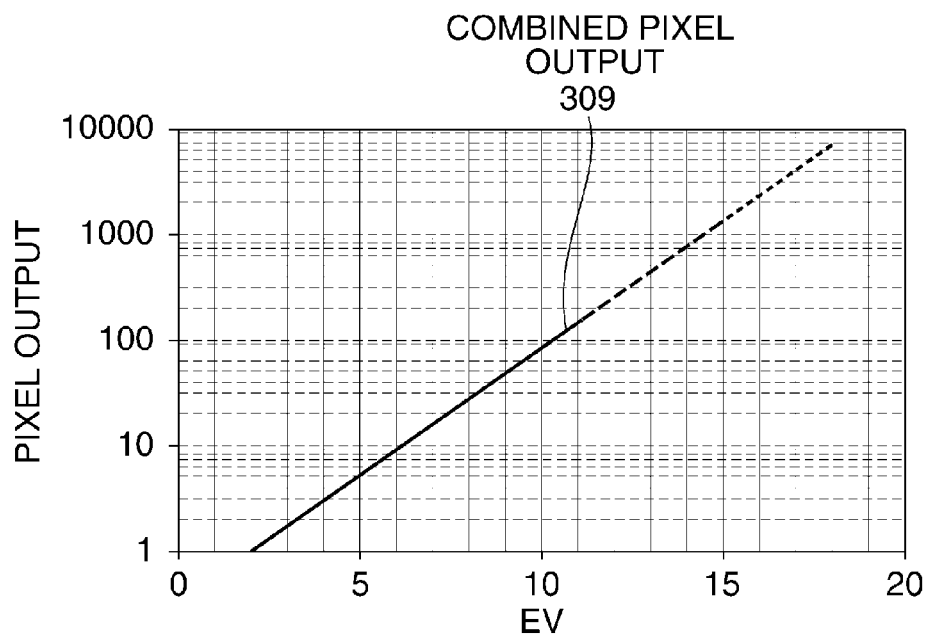

FIGS. 4A and 4B are views useful in explaining the relationship between output from the AE sensor 111 in FIG. 2 and luminance (EV), in which FIG. 4A shows a state before combining, and FIG. 4B shows a state after combining.

Referring to FIGS. 4A and 4B, the axis of abscissa indicates output from pixels, and the axis of ordinate indicates EV (exposure value). Referring to FIG. 4A, a predetermined accumulation period is set for a high-sensitivity pixel, and a pixel output (that is, a pixel signal) 306 is output from the high-sensitivity pixel. Here, the pixel output 306 with about Ev 2 to Ev 12 is obtained. When an accumulation period for a low-sensitivity pixel is made coincident with the accumulation period for the high-sensitivity pixel, a pixel output 307 is output from the low-sensitivity pixel.

Assuming here that the sensitivity of the high-sensitivity pixel is eight times as high as the sensitivity of the low-sensitivity pixel, the pixel output 307 with about Ev 5 to Ev 15 is obtained. By combining the pixel outputs 306 and 307 together, a combined output with a dynamic range enlarged about three levels, i.e. with about Ev 2 to Ev 15 is obtained.

On the other hand, when an accumulation period which is one-eighth of an accumulation period for the high-sensitivity pixel is set for the low-sensitivity pixel, a pixel output 308 is output from the low-sensitivity pixel. Here, a pixel output 308 with about Ev 8 to EV 18 is obtained. By combining the pixel outputs 306 and 308 together, a combined output with a dynamic range further enlarged about three levels, i.e. with about Ev 2 to Ev 18 is obtained.

Since the length of the accumulation period for a low-sensitivity pixel is set shorter than that for a high-sensitivity pixel as described above, a dynamic range of a unit pixel is enlarged. Even when a high-sensitivity pixel and a low-sensitivity pixel have the same sensitivity, length of accumulation periods for them are made different, so that a dynamic range is enlarged depending on a difference between the accumulation periods.

The combining unit 205 described above with reference to FIG. 2 compares a pixel output from a high-sensitivity pixel with a predetermined value, for example, 512 counts. When the pixel output from the high-sensitivity pixel is smaller than the predetermined value, the combining unit 205 selects and outputs the pixel output from the high-sensitivity pixel.

on the other hand, when the pixel output from the high-sensitivity pixel is greater than the predetermined value, the combining unit 205 selects and outputs a pixel output from a low-sensitivity pixel. On this occasion, according to a difference in sensitive and a ratio between length of accumulation periods, the combining unit 205 corrects a gain of the pixel output from the low-sensitivity pixel and then outputs the same.

In a combined pixel output 309 in FIG. 4B, a part indicated by a solid line is a pixel output from a high-sensitivity pixel, and a part indicated by broken lines is a pixel output from a low-sensitivity pixel. Since the combining unit 205 thus corrects a gain of a pixel output from a low-sensitivity pixel, the need for correction at a subsequent stage is eliminated to make signal processing easier.

Figure 5A:
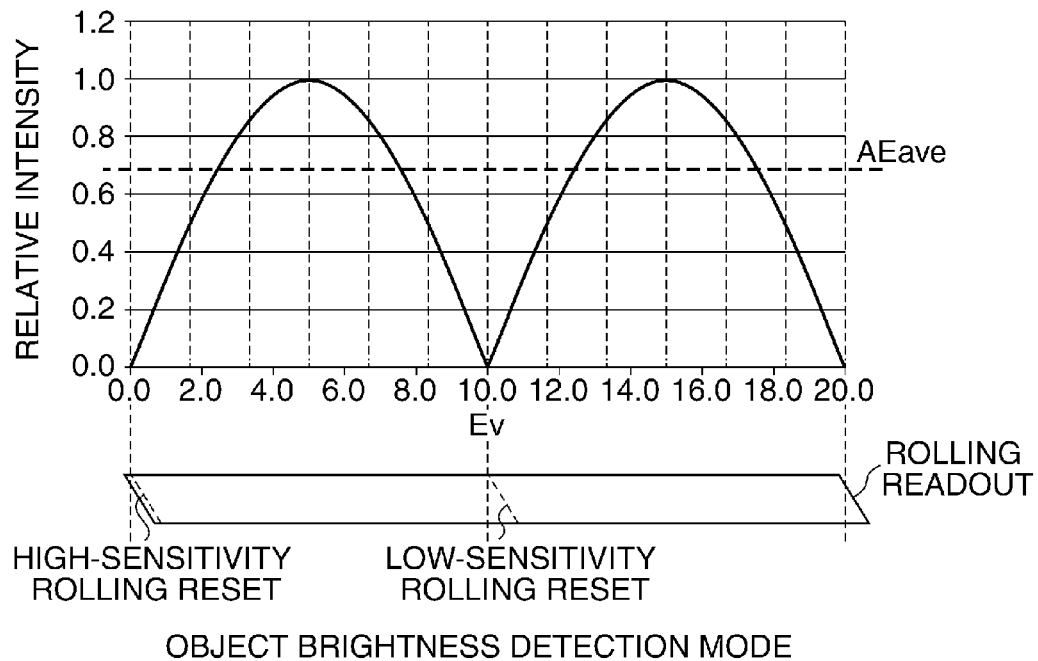
Figure 5B:
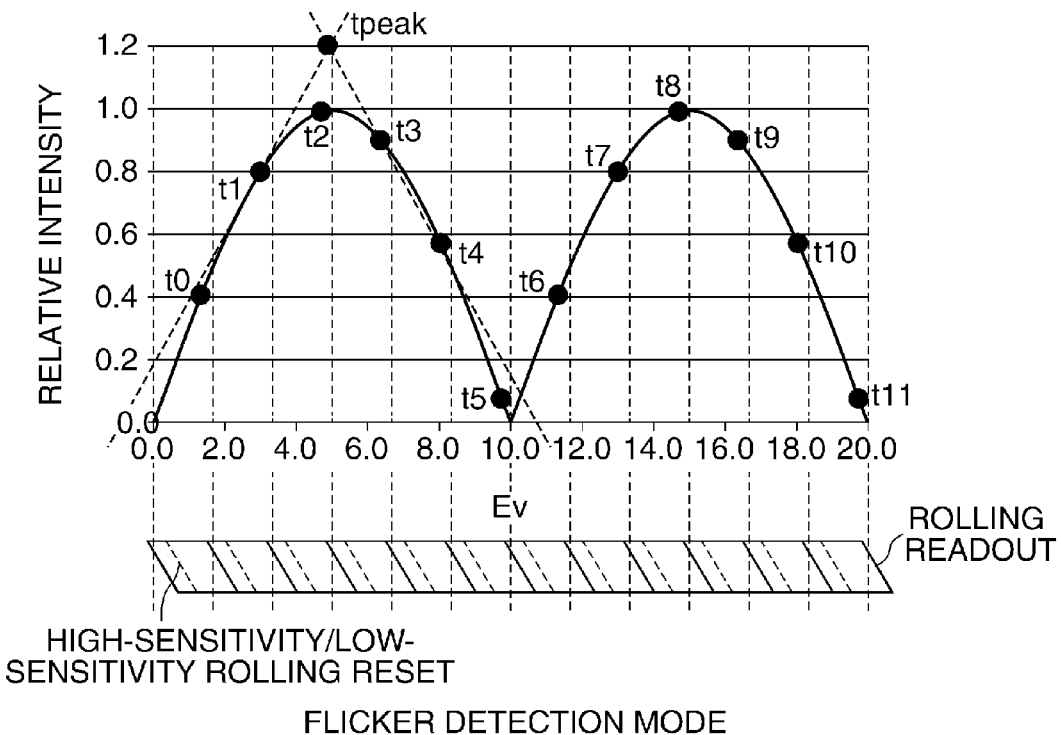

FIGS. 5A and 5B are views useful in explaining the relationship between accumulation and readout performed in a camera shown in FIG. 1 and a flicker light source in an object brightness detection mode and a flicker detection mode, in which FIG. 5A shows a case where the camera is placed in the object brightness detection mode, and FIG. 5B shows a case where the camera is placed in the flicker detection mode. In the flicker detection mode, an image signal for use in calculating light amount changing characteristics such as cycles of change in the amount of light from an object and the times at which the amount of light satisfies predetermined conditions are obtained. In the following description, a light source which lights up at a frequency of 50 Hz is taken as an example of the flicker light source.

Assuming now that the flicker light source is detected in the flicker detection mode, to be described later, photometric measurement is carried out in the object brightness detection mode after accumulation periods are set so as to obtain an average photometric value with no effects of flicker. In the example shown in FIG. 5A, the length of the accumulation period for high-sensitivity pixels is set at 20 ms, and the length of the accumulation period for low-sensitivity pixels is set at 10 ms. Namely, length of accumulation periods are set here at values which are n times (predetermined times) as large as a flicker period, and average photometric values (AEave) with no effects of flicker are obtained.

On this occasion, by making length of accumulation periods for high-sensitivity pixels and low-sensitivity pixels different, a wide dynamic range is obtained. By setting a difference in length of accumulation period according to a object brightness and the presence or absence of detected flicker, a wider dynamic range is obtained.

In the example shown in FIG. 5B, a light source which lights up at a frequency of 50 Hz is subjected to photometric measurement at a frame rate of 600 Hz. For the flicker light source with the frequency of 50 Hz, photometric measurement for 12 frames at the frame rate of 600 Hz enables sampling for two cycles of the flicker light source. It should be noted that for the light source with the frequency of 60 Hz, photometric measurement for 10 frames enables sampling for two cycles of the flicker light source.

Photometric measurement for two cycles of the flicker light source enables the AE CPU 118 to find a time period from a sampling start time point t0 to a peak position tpeak of the flicker light source, and according to a time difference between peak positions in the respective two cycles, detect a frequency of the flicker light source. The peak position tpeak is found by performing interpolation computations using data at a plurality of sampling points astride a true peak position tpeak. Detailed description of interpolation computations is omitted because there are a variety of known methods therefor.

After finding the peak position tpeak and the flicker period using the sampling start time point t0 as a starting point, the AE CPU 118 generates a synchronization signal (flicker synchronization signal) for operating the shutter 107 in accordance with the period of the peak position tpeak. It should be noted that the synchronization signal is generated with consideration given to, for example, a time lag in operation of the shutter 107. As a result, the shutter timing of actual exposure is synchronized with the peak position tpeak of the flicker light source using the flicker synchronization signal, and even under the flicker light source, shooting using a high-speed shutter is enabled while flicker is reduced.

Moreover, because in the flicker detection mode, photometric measurement is performed at a high frame rate such as 600 Hz as described above, accumulation periods are set at up to 1.66 ms. For this reason, in order to detect low luminance, it is necessary to split an output from a unit pixel into all pixels or predetermined blocks and perform additions to improve the S/N ratio.

In the AE sensor 111 described above, a unit pixel has a plurality of pixels differing in sensitivity, and length of accumulation periods for these pixels are made different to enlarge a dynamic range.

On the other hand, when an attempt to enlarge a dynamic range is made by making length of accumulation periods for pixels different, only a combined pixel output is obtained because a combining process is carried out by the combining unit 205 in FIG. 2. Thus, pixel signals with different length of accumulation periods are mixed on the overall screen or a predetermined block of an image obtained by the AE sensor 111, and hence a barycentric position of accumulation periods cannot be estimated with accuracy. This deteriorates flicker detection accuracy.

For this reason, as shown in FIG. 5B, high-sensitivity pixels and low-sensitivity pixels are subjected to rolling reset at the same time, so that a barycentric position of accumulation periods does not change irrespective of a combining process carried out by the combining unit 205. Namely, accumulation and readout control for high-sensitivity pixels and low-sensitivity pixels is performed with substantially the same timing to enable accurate flicker detection irrespective of a combining process carried out by the combining unit 205.

Figure 6:
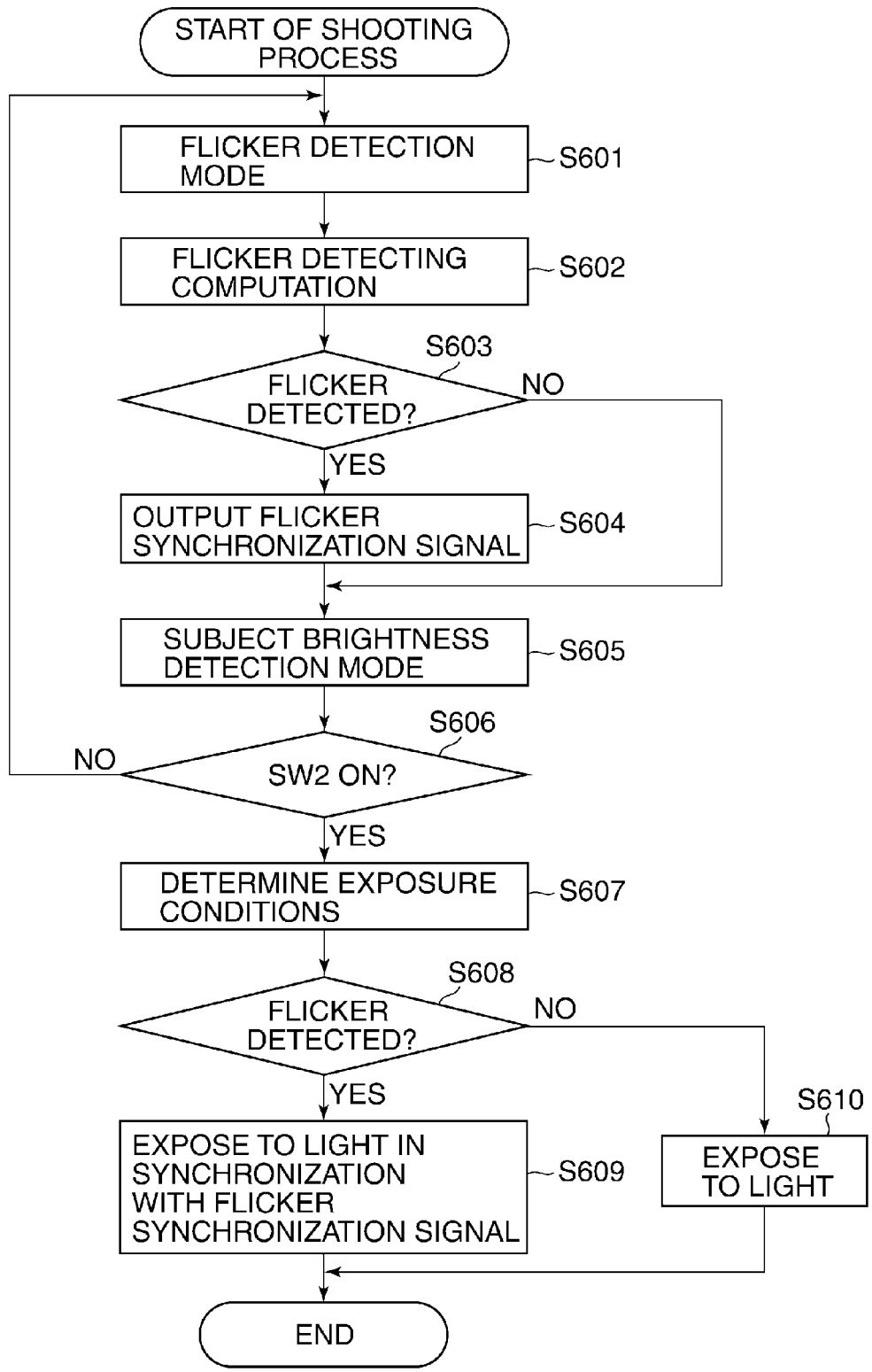
FIG. 6 is a flowchart useful in explaining a shooting process carried out by the camera in FIG. 1.

FIG. 6 is a flowchart useful in explaining a shooting process carried out by the camera in FIG. 1. It should be noted that processes in the flowchart of FIG. 6 are carried out under the control of the camera CPU 119.

When a shooting process is started, the camera CPU 119 instructs the AE CPU 118 to start photometric measurement. In response to this, the AE CPU 118 starts photometric measurement. First, the AE CPU 118 controls the AE sensor 111 to execute a flicker detection mode for detecting the presence or absence of a flicker light source as well as a peak position and a flicker period. The AE CPU 118 then obtains an image signal from the AE sensor 111 (step S601).

Next, the AE CPU 118 performs flicker detecting computations based on the obtained image signal to find whether or not flicker is occurring and then obtains a peak position and a flicker period (step S602). Then, the AE CPU 118 checks a flicker detection result and determines whether or not flicker has been detected (step S603). When flicker has been detected (YES in the step S603), the AE CPU 118 generates the flicker synchronization signal described above according to the peak position and the flicker period obtained as a result of the detection and outputs the flicker synchronization signal to the camera CPU 119 (step S604).

After that, the AE CPU 118 executes the object brightness detection mode described above to measure an object brightness by photometric measurement (step S605). It should be noted that when the AE CPU 118 determines that flicker has not been detected (NO in the step S603), the process proceeds to the step S605.

An image signal with a wide dynamic range is obtained from the AE sensor 111 by executing the object brightness detection mode, and this prevents false detection arising from saturation and blocked up shadows and improves photometric measurement accuracy. It should be noted that when the flicker detection mode and the object brightness detection mode are brought to an end, the AE CPU 118 notifies the camera CPU 119 to this effect.

Then, the camera CPU 119 determines whether or not the switch SW2 has been turned on by pressing a shutter-release button (not shown) all the way down (step S606). When the camera CPU 119 determines that the switch SW2 is off (NO in the step S606), the process returns to the step S601, in which the camera CPU 119 causes the AE CPU 118 to execute the flicker detection mode.

When the switch SW2 is on (YES in the step S606), the camera CPU 119 receives an object brightness detection result obtained in the object brightness detection mode from the AE CPU 118, determines exposure conditions according to the object brightness detection result, and sets a shutter speed, an f number, and an ISO sensitivity (step S607). Then, referring to the flicker detection result, the camera CPU 119 determines whether or not flicker has been detected (step S608).

When flicker has been detected (YES in the step S608), the camera CPU 119 releases the shutter to expose the image pickup unit 108 to light in synchronization with the flicker peak position in response to the flicker synchronization signal (step S609). The camera CPU 119 then terminates the shooting process.

On the other hand, when flicker has not been detected (NO in the step S608), the camera CPU 119 releases the shutter to expose the image pickup unit 108 to light (step S610) and terminates the shooting process.

As described above, according to the embodiment of the present invention, length of accumulation periods for a plurality of pixels provided in each unit pixel of the AE sensor 111 and differing in terms of sensitivity vary between the flicker detection mode and the object brightness detection mode. This reduces flicker and enlarges a dynamic range during photometric measurement or shooting.

As is obvious from the above description, in the example shown in FIG. 1, the AE sensor 111 is an image pickup device, and the AE CPU 118 and the camera CPU 119 act as a setting unit and a mode selection unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-115749, filed Jun. 4, 2014, which is hereby incorporated by reference herein in its entirety.

What is claimed is:

1. An image pickup apparatus comprising:
  an image pickup device configured to have a plurality of unit pixel areas arranged in a two-dimensional matrix;
  a setting unit configured to set electric charge accumulation periods for a plurality of first pixels and a plurality of second pixels included in the plurality of unit pixel areas as a first accumulation period and a second accumulation period, respectively; and
  a mode selection unit configured to select a first mode in which an image signal for use in detecting flicker of light is obtained, or a second mode in which an image signal for use in detecting an object brightness is obtained,
  wherein when the mode selection unit selects the first mode, the setting unit sets the first accumulation period and the second accumulation period such that a first barycentric position which is a barycentric position of the first accumulation period for the plurality of first pixels included in the plurality of unit pixel areas and a second barycentric position which is a barycentric position of the second accumulation period for the plurality of second pixels included in the plurality of unit pixel areas correspond to each other,
  wherein when the mode selection unit selects the second mode after the flicker of light is detected in the first mode, the setting unit sets the first accumulation period and the second accumulation period based on light amount changing characteristics of the flicker of light detected in the first mode,
  wherein when the mode selection unit selects the second mode without the flicker of light being detected in the first mode, the setting unit sets the first accumulation period and the second accumulation period independently of light amount changing characteristics of the flicker of light,
  wherein the first accumulation period and the second accumulation period at least partially overlap each other, and
  wherein in the second mode, the first accumulation period is different in length of time from the second accumulation period.

2. The image pickup apparatus according to claim 1, wherein when the mode selection unit selects the first mode, the setting unit sets the first accumulation period and the second accumulation period at the same length of time.

3. The image pickup apparatus according to claim 1, wherein when the mode selection unit selects the second mode, the setting unit sets the first accumulation period and the second accumulation period such that the first barycentric position and the second barycentric position do not correspond to each other.

4. The image pickup apparatus according to claim 1, wherein the first pixels and the second pixels differ in terms of sensitivity.

5. The image pickup apparatus according to claim 4, wherein when the mode selection unit selects the second mode, the setting unit sets accumulation periods such that a length of an accumulation period for pixels with higher sensitivity between the first pixels and the second pixels is longer than a length of an accumulation period for pixels with lower sensitivity.

6. The image pickup apparatus according to claim 1, wherein the first barycentric position indicates a center from start to end of accumulation of the entirety of the plurality of first pixels included in the plurality of unit pixel areas.

7. The image pickup apparatus according to claim 1, wherein the second barycentric position indicates a center from start to end of accumulation of the entirety of the plurality of second pixels included in the plurality of unit pixel areas.

8. The image pickup apparatus according to claim 1, wherein start timing of electric charge accumulation in the image pickup device is different in each line of the image pickup device.

9. The image pickup apparatus according to claim 1, wherein when the mode selection unit selects the first mode, the setting unit sets the first accumulation period and the second accumulation period shorter than one cycle of the flicker.

10. The image pickup apparatus according to claim 1, wherein the first pixel and the second pixel are defined as different areas included in the unit pixel of the image pickup device, and each row of the image pickup device is comprised of the plurality of the unit pixels.

11. A control method for an image pickup apparatus which has an image pickup device having a plurality of unit pixel areas arranged in a two-dimensional matrix and obtains an image signal from the image pickup device, comprising:
a setting step of setting electric charge accumulation periods for a plurality of first pixels and a plurality of second pixels included in the plurality of unit pixel areas as a first accumulation period and a second accumulation period, respectively; and
a mode selection step of selecting a first mode in which an image signal for use in detecting flicker of light is obtained, or a second mode in which an image signal for use in detecting an object brightness is obtained,
wherein when the first mode is selected in the mode selection step, the first accumulation period and the second accumulation period are set in the setting step such that a first barycentric position which is a barycentric position of the first accumulation period for the plurality of first pixels included in the plurality of unit pixel areas and a second barycentric position which is a barycentric position of the second accumulation period for the plurality of second pixels included in the plurality of unit pixel areas correspond to each other,
wherein when the mode selection step selects the second mode after the flicker of light is detected in the first mode, the setting step sets the first accumulation period and the second accumulation period based on light amount changing characteristics of the flicker of light detected in the first mode,
wherein when the mode selection step selects the second mode without the flicker of light being detected in the first mode, the setting step sets the first accumulation period and the second accumulation period independently of light amount changing characteristics of the flicker of light,
wherein the first accumulation period and the second accumulation period at least partially overlap each other, and
wherein in the second mode, the first accumulation period is different in length of time from the second accumulation period.

12. A non-transitory computer-readable storage medium storing a program for causing a computer to execute a control method for an image pickup apparatus which has an image pickup device having a plurality of unit pixel areas arranged in a two-dimensional matrix and obtains an image signal from the image pickup device, the control method comprising:
a setting step of setting electric charge accumulation periods for a plurality of first pixels and a plurality of second pixels included in the plurality of unit pixel areas as a first accumulation period and a second accumulation period, respectively; and
a mode selection step of selecting a first mode in which an image signal for use in detecting flicker of light is obtained, or a second mode in which an image signal for use in detecting an object brightness is obtained,
wherein when the first mode is selected in the mode selection step, the first accumulation period and the second accumulation period are set in the setting step such that a first barycentric position which is a barycentric position of the first accumulation period for the plurality of first pixels included in the plurality of unit pixel areas and a second barycentric position which is a barycentric position of the second accumulation period for the plurality of second pixels included in the plurality of unit pixel areas correspond to each other,
wherein when the mode selection step selects the second mode after the flicker of light is detected in the first mode, the setting step sets the first accumulation period and the second accumulation period based on light amount changing characteristics of the flicker of light detected in the first mode,
wherein when the mode selection step selects the second mode without the flicker of light being detected in the first mode, the setting step sets the first accumulation period and the second accumulation period independently of light amount changing characteristics of the flicker of light,
wherein the first accumulation period and the second accumulation period at least partially overlap each other, and
wherein in the second mode, the first accumulation period is different in length of time from the second accumulation period.

* * * * *